(No Model.)

J. F. ALLEN.
AGRICULTURAL FORK.

No. 327,052. Patented Sept. 29, 1885.

Witnesses:
Parker H. Sweet Jr
Riley A. Sweet.

Inventor:
John F. Allen.
By L. Bingham
Atty.

UNITED STATES PATENT OFFICE.

JOHN F. ALLEN, OF MARTINSDALE, MONTANA TERRITORY.

AGRICULTURAL FORK.

SPECIFICATION forming part of Letters Patent No. 327,052, dated September 29, 1885.

Application filed June 24, 1885. (No model.)

*To all whom it may concern:*

Be it known that I, JOHN F. ALLEN, of Martinsdale, in the county of Meagher and Territory of Montana, have invented certain new and useful Improvements in Agricultural Forks; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention relates to improvements in the construction of agricultural forks, spades, and other similar agricultural implements, the object being to provide a novel and simplified means whereby the handle of the implement may be readily removed from the ferrule in case of breakage and a new handle as readily substituted in place thereof; and my improvements consist, essentially, in providing a metallic sleeve or ferrule, preferably formed solid with the metallic portion of the fork, spade, or other similar implement, having a rectangular slot through the same which corresponds in size and shape to a similar slot in the handle of the implement, and whereby the said handle and ferrule are held in operative relations to each other by the interposition of blocks and a wedge in said slots, all as will be hereinafter fully described, and pointed out in the claims.

Figure 1:
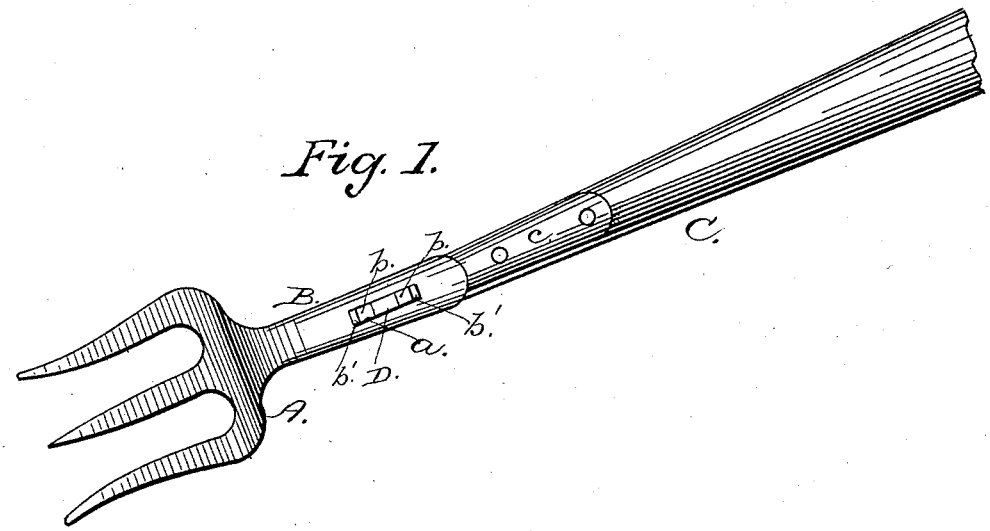
Figure 2:
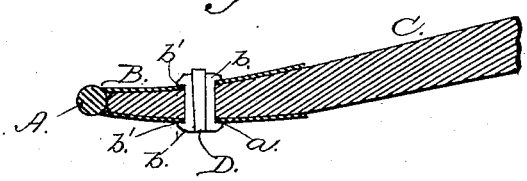
Figure 3:

In the accompanying drawings, Figure 1 represents a perspective view of my complete invention; Fig. 2, a detail sectional view of the same, and Fig. 3 a detail view of the ferrule and part of the handle.

Similar letters of reference indicate like parts in all the figures.

In carrying out my invention the fork, spade, or other similar implement is provided with a hollow sleeve or ferrule, B, which is preferably formed solid with the metallic portion A of the implement, said sleeve or ferrule being provided with a central rectangular slot, *a*, extending through the same from one side to the other, as shown. The wooden handle, C, of the implement is provided with two metallic straps, *c*, one on each side, and through which and the underlying wood is formed a slot, *d*, corresponding in size and shape to that of the slot *a* in the sleeve or ferrule B. The handle C being adjusted in the sleeve or ferrule B, with the slots *c* and *d* in juxtaposition with each other, two metallic blocks, *b*, having a shoulder or projection, *b'*, at each end are inserted in the slots in such manner as to leave a small space or recess between the two blocks for the interposition of the wooden wedge D to secure the parts together, the projections *b'* upon said blocks overlapping upon the sleeve or ferrule, as shown in the drawings.

By means of this improved construction the handle C may be readily connected to or disconnected from the fork, spade, or other similar implement; or, in case of a broken handle, a new one may be readily substituted in its place without the aid of skilled labor or loss of time.

Having thus described my invention, I claim as new and useful—

1. The herein-described agricultural fork, provided with the hollow sleeve or ferrule B, having slot *a*, and the handle C, provided with a corresponding slot, *d*, the metallic blocks *b*, and wedge D, substantially as and for the purpose specified.

2. In an agricultural fork, the hollow sleeve or ferrule B, provided with the slot *a*, in combination with the handle C, having metallic straps *c*, and slot *d*, metallic blocks *b*, having projections *b'*, and wedge D, substantially as and for the purpose specified.

In testimony that I claim the foregoing as my own I affix my signature in presence of two witnesses.

JOHN F. ALLEN.

Witnesses:
J. M. SMITH,
JEFF HOWELL.